(12) United States Patent
Tseng et al.

(10) Patent No.: US 6,240,720 B1
(45) Date of Patent: Jun. 5, 2001

(54) HYBRID-COMPOSITE GAS TURBINE EXHAUST NOZZLE COMPRESSION LINK

(75) Inventors: Wu-Yang Tseng; Charles R. Wojciechowski, both of West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/391,909

(22) Filed: Sep. 9, 1999

(51) Int. Cl.[7] .............................. F02K 1/00; B05B 12/00

(52) U.S. Cl. .................. 60/271; 239/265.33; 239/265.37

(58) Field of Search .................... 60/271; 239/265.33, 239/265.37

(56) References Cited

U.S. PATENT DOCUMENTS 6,142,416 * 11/2000 Markstein et al. .............. 239/265.33

* cited by examiner

*Primary Examiner*—Charles G. Freay
(74) *Attorney, Agent, or Firm*—Andrew C. Hess; David L. Narciso

(57) ABSTRACT

A hybrid-composite gas turbine exhaust nozzle compression link is formed as an elongated hollow tubular cylindrical shell having an axis of elongation. In cross section taken perpendicular to the axis of elongation, the shell has a structure of an inner rim of an inner-rim titanium-base alloy, a reinforcing layer having reinforcing fibers such as silicon carbide fibers extending parallel to the axis of elongation and embedded in a matrix titanium-base alloy, and an outer rim of an outer-rim titanium-base alloy. The titanium-base alloys are typically of the same nominal composition. Attachment fittings are present at each end of the shell.

19 Claims, 5 Drawing Sheets

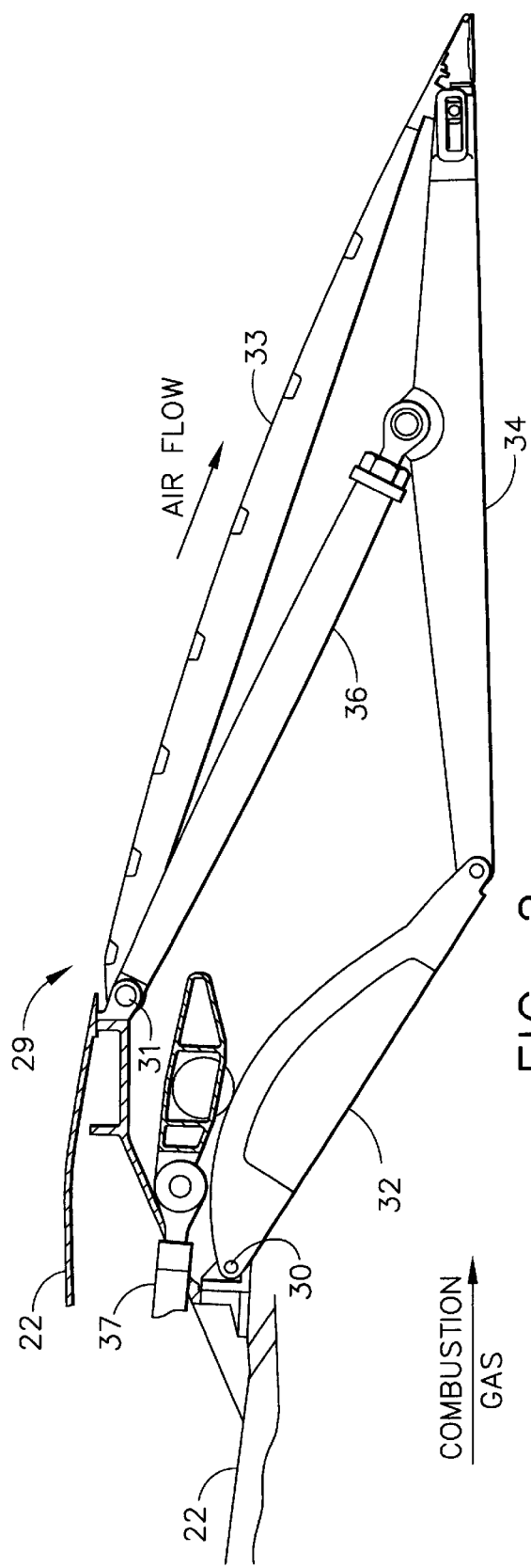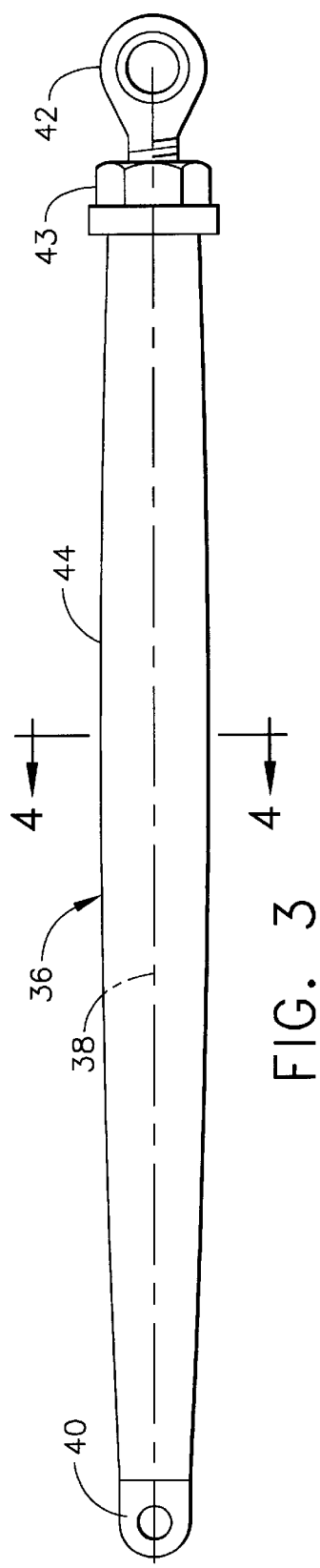
FIG. 2
FIG. 3

HYBRID-COMPOSITE GAS TURBINE EXHAUST NOZZLE COMPRESSION LINK

The invention herein described was made in the course of or under a contract, or a subcontract thereunder, with the United States Department of the Air Force.

FIELD OF THE INVENTION

This invention relates to gas turbine engines, and, more particularly, to the structure of the exhaust nozzle compression link used on some engines.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

In some gas turbine engines, there is an exhaust nozzle flap structure at the back of the engine. The exhaust nozzle flap structure is formed of a series of individual exhaust nozzle flap segments arranged in a generally cylindrical fashion around the periphery of the engine at its exhaust end. The exhaust nozzle flap segments may be pivoted inwardly or outwardly, so as to change the size of the outlet passage through which the hot exhaust gases flow. This change in geometry alters the performance of the engine in a controllable manner. Each exhaust nozzle flap segment includes inner flaps which contact the hot combustion gas flow to shape it, and an outer flap which ensures aerodynamic efficiency.

Each of the exhaust nozzle flap segments is supported on a pivot structure at its forwardmost end. The inner and outer flaps are connected to each other and to the remainder of the engine structure in the form of a geometric linkage. The linkage includes an exhaust nozzle compression link. When the exhaust nozzle flap segment is moved by an actuator, the exhaust nozzle compression link aids in maintaining the correct geometrical relation of the inner flaps and the outer flap. The exhaust nozzle compression link is subjected to large compressive loads by the aerodynamic forces exerted by the combination of the hot combustion gas on the inner flaps and the external air flow on the outer flap.

The exhaust nozzle compression link is a vital component in the actuation of the flap structure. In conventional construction, the exhaust nozzle compression link is a rectangular-section hollow strut with a fitting at each end. The exhaust nozzle compression link is made of a nickel-base superalloy in order to withstand heating to about 800° F. resulting from the hot exhaust gases, while providing the necessary compressive strength to support the flap structure and the aerodynamic loading.

There is always a desire to reduce the weight of aircraft gas turbine engines, while retaining acceptable performance. Weight reductions in the area of the exhaust nozzle are highly beneficial to aircraft performance and maneuverability, because of the distance of the exhaust nozzle from the center of gravity of the aircraft. The need to reduce weight to achieve these benefits extends to individual components, such as the exhaust nozzle compression link. The present invention fulfills the need for reduced weight and acceptable performance, and further provides related advantages.

BRIEF SUMMARY OF THE INVENTION

The present invention provides a gas turbine exhaust nozzle compression link with fully acceptable performance and with about 40 percent less weight than a conventional exhaust nozzle compression link. The exhaust nozzle compression link of the invention has substantially the same fit and function as the conventional exhaust nozzle compression link. The design of the exhaust nozzle compression link allows it to utilize composite-materials technology to take advantage of its high elastic modulus and strength at moderately elevated temperatures of about 800° F.

A hybrid-composite gas turbine exhaust nozzle compression link comprises an elongated hollow tubular shell having an axis of elongation. The elongated hollow tubular shell has a structure in cross section taken perpendicular to the axis of elongation comprising at least one reinforcing layer (and preferably from one to ten reinforcing layers) comprising reinforcing fibers extending parallel to the axis of elongation, and a body comprising at least one titanium-base alloy in which the reinforcing fibers are disposed.

In one embodiment, the hybrid-composite exhaust nozzle compression link comprises an inner rim of an inner-rim titanium-base alloy, a reinforcing layer (preferably one to ten reinforcing layers) comprising reinforcing fibers extending parallel to the axis of elongation, and an outer rim of a outer-rim titanium-base alloy. The reinforcing layer preferably further includes a matrix in which the reinforcing fibers are disposed. The reinforcing fibers are preferably silicon carbide, and the matrix is preferably a matrix titanium-base alloy. The inner-rim titanium-base alloy, the outer-rim titanium-base alloy, and the matrix titanium-base alloy, where present, are preferably, but not necessarily, of the same nominal composition.

The elongated hollow tubular shell is preferably in the form of a hollow right circular cylinder. There are attachment fittings at each end of the elongated hollow tubular shell. Desirably, one of the attachment fittings is formed integrally with the tubular shell, and the other attachment fitting is joined to the tubular shell by an adjustable joint such as a threaded attachment.

The structure having a rim and reinforcing fibers extending parallel to the axis of elongation allows the hollow tubular shell to carry large compressive loadings without buckling. In most applications involving reinforcing fibers, the imposed loadings are tensile. The present approach has a cross-sectional rigidity that is 25 percent or more higher than that of pure titanium, resulting in a higher buckling load capacity and reduced weight for the structure. The preferred embodiment places the reinforcing fibers between the rims of titanium-base alloys, which constrains the reinforcing fibers against buckling but still utilizes their high elastic modulus and high strength. The reinforcing fibers are protected against damage of the hot exhaust gases and impact damage by the titanium-base alloys that overlie them.

The composite material of high-modulus, high-strength reinforcing fibers such as silicon carbide fibers in a titanium-alloy matrix is carefully selected to provide the required elastic modulus and strength in compressive loading at the operating temperature of about 800° F., while substantially reducing the weight of the exhaust nozzle compression link. The elastic modulus of the composite material provides a higher resistance to buckling due to the compressive loads that the exhaust nozzle compression link must carry in the exhaust nozzle flap structure.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a schematic elevational view of the back end of an aircraft gas turbine engine of FIG. 1, illustrating the location of the exhaust nozzle compression link in the exhaust nozzle flap structure;

FIG. 3 is an elevational view of the gas turbine exhaust nozzle compression link;

FIGS. 4A–4D are sectional views of the gas turbine exhaust nozzle compression link of FIG. 3, taken on line 4—4, wherein FIG. 4A is a view of the entire compression link, and FIGS. 4B–4D are enlargements at locations around its circumference;

DETAILED DESCRIPTION OF THE INVENTION

Figure 1:
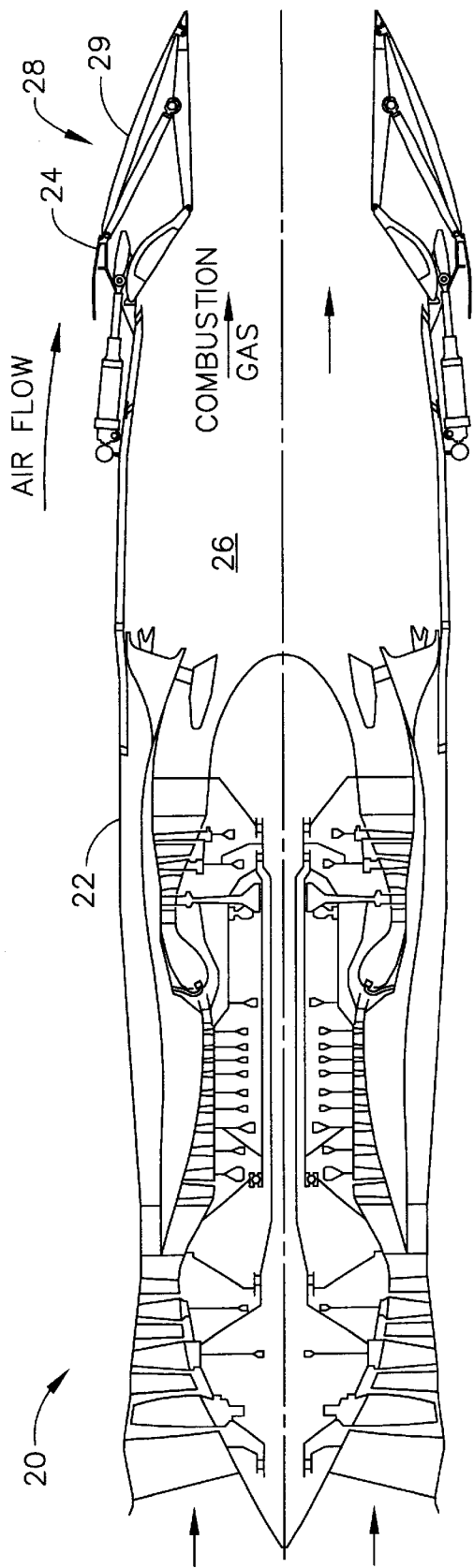
FIG. 1 is a schematic elevational view of an aircraft gas turbine engine.

FIG. 1 depicts an aircraft gas turbine engine 20. The engine 20 includes a generally cylindrical housing 22 having an aft or back end 24. In operation, hot exhaust gas flow flows through a central region 26 near the back end 24 of the housing 22 of the engine 20, and exterior air flows over the external surface of the housing 22. At the back end 24, there is an exhaust nozzle flap structure 28, which is formed of a series of exhaust nozzle flap segments 29 arranged around the circumference of the back end 24 of the engine 20.

FIG. 2 illustrates one of the exhaust nozzle flap segments 29 in greater detail. The exhaust nozzle flap segment 29 is pivotably attached to the housing 22 by a pivot structure including a first pivot 30 and a second pivot 31. A first end of a convergent flap 32 is pivotably attached to the first pivot 30, and a first end of an outer flap 33 is pivotably attached to the second pivot 31. A divergent flap 34 is pivotably attached between a second end of the convergent flap 32 and a second end of the outer flap 33. An exhaust nozzle compression link 36 is pivotably attached at one end to the second pivot 31 and at a second end to the divergent flap 34 at an intermediate position along its length. An actuator 37 presses against the convergent flap 32 to cause it to pivot about the first pivot 30. In this arrangement, the exhaust nozzle compression link 36 must be able to carry large compressive loadings imposed by the weight of the structure and also the aerodynamic forces imposed by both the hot combustion gas contacting the convergent flap 32 and the divergent flap 34, and the external airflow contacting the outer flap 33.

All of the exhaust nozzle flap structure segments 29 arranged around the circumference of the back end 24 of the engine operate in a coordinated fashion. In each case, as the convergent flap 32 pivots about the first pivot 30, the linkage formed of the convergent flap 32, the divergent flap 34, the outer flap 33, and the exhaust nozzle compression link 36 pivots in a counter-clockwise direction (as shown in FIG. 2) to increase the diameter of the back end 24 of the engine 20, or in a clockwise direction to decrease the diameter of the back end 24. Aircraft engines with exhaust nozzle flap structures are known in the art with regard to features other than the design and structure of the exhaust nozzle compression link 36 as discussed herein. Therefore only the general features relevant to an understanding of the location and function of the exhaust nozzle compression link 36 have been discussed herein.

FIG. 3 illustrates the exhaust nozzle compression link 36 in greater detail. The exhaust nozzle compression link 36 comprises an elongated hollow tubular shell 44 having an axis of elongation 38. In service, the compressive loadings are applied parallel to the axis of elongation 38. A first attachment fitting 40, here illustrated as a clevis, is found on a first end of the elongated hollow tubular shell 44. A second attachment fitting 42, here illustrated as a threaded link maintained at a selected axial position by a nut 43, is found on a second end of the elongated hollow tubular shell 44. The attachment fittings 40 and 42 may be of any operable type, and different types are used in different engine applications. However, it is preferred that the first attachment fitting be formed integrally (e.g., by layup and a hot isostatic pressing process) with the hollow tubular shell 44 rather than be formed separately and then attached to the hollow tubular shell 44, as by welding or brazing, in order to save weight. It is also preferred that the second attachment fitting 42 be threadably engaged to the hollow tubular shell 44.

Figure 4A:
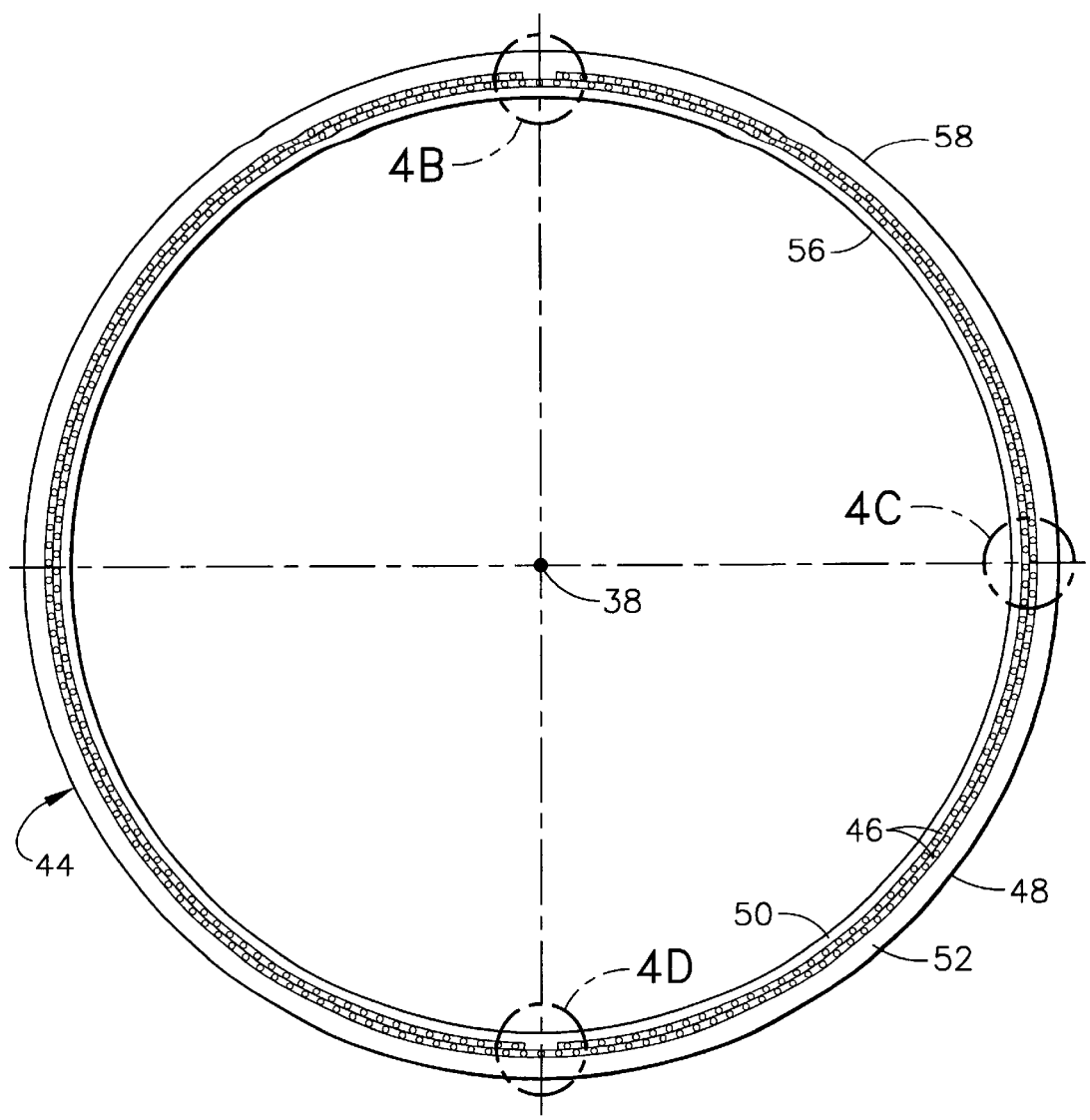

FIGS. 4A–4D illustrate the preferred structure of the exhaust nozzle compression link 36 in greater detail, in sectional views taken perpendicular to the axis of elongation 38. The elongated portion of the exhaust nozzle compression link 36 is in the form of the hollow tubular shell 44, preferably a hollow cylindrical shell or a round-corner tube, and most preferably a hollow right-circular cylindrical shell as illustrated in FIG. 4A. The elongated tubular shell 44 is formed of at least one reinforcing layer (preferably one to ten reinforcing layers) of reinforcing fibers 46 extending parallel to the axis of elongation 38 (which extends out of the page in FIG. 4A) and disposed within a body 48 of at least one titanium-base alloy. As used herein, a "titanium-base alloy" is an alloy having more titanium present than any other element. The use of a titanium-base alloy is one key feature of the present invention, as the titanium-base alloys are light in weight, and have sufficient elastic modulus and strength at 800° F., when reinforced by the reinforcement fibers 46, to carry the compressive loads imposed during service on the exhaust nozzle compression link 36.

Figure 4B:
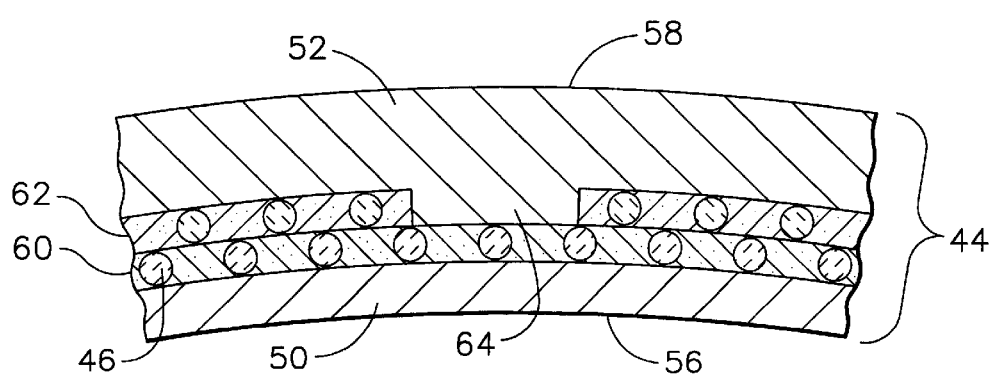
Figure 4C:
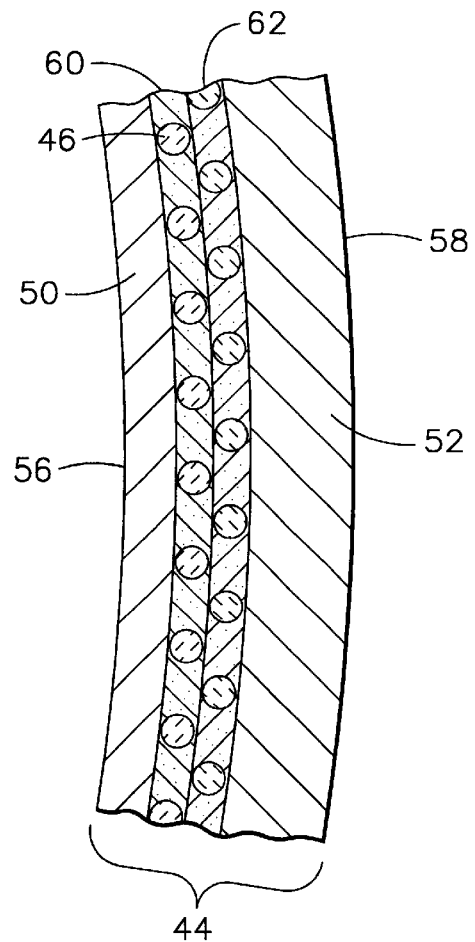
Figure 4D:
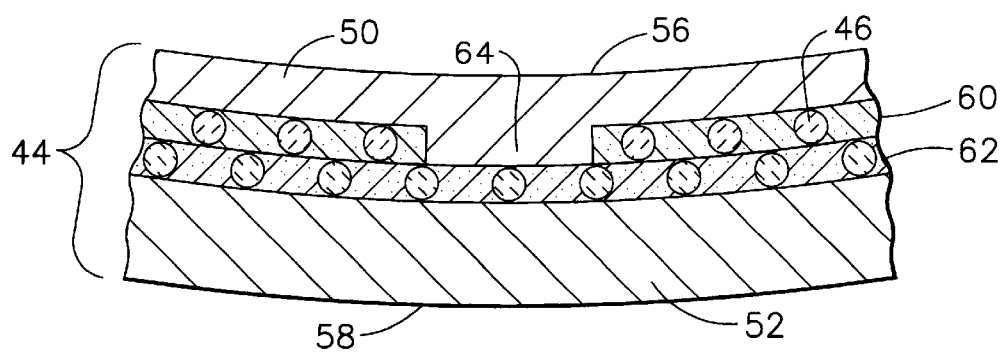
Figure 5:
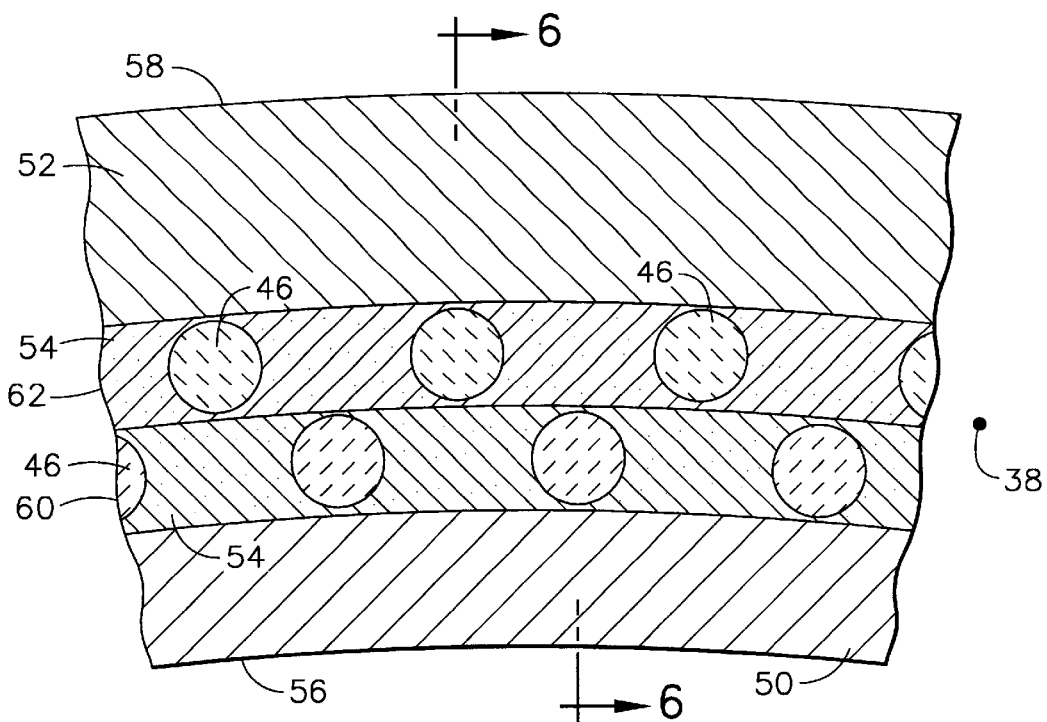
FIG. 5 is a further enlargement of a portion of the shell of the exhaust nozzle compression link.

FIGS. 4B–4D are enlarged details of various regions around the periphery of the preferred form of the shell 44. (The structure on the left-hand side of the shell is the same as that on the right-hand side, as depicted in FIG. 4C.) FIG. 5 shows the structure in the region of FIG. 4C, which is representative of all of the regions, in even greater detail. In all regions, there is an inner rim 50 comprising an inner rim titanium-base alloy, and an outer rim 52 comprising an outer rim titanium-base alloy. The inner rim titanium-base alloy and the outer rim titanium base alloy are preferably of the same nominal composition, but they may be of different nominal compositions.

Figure 6:
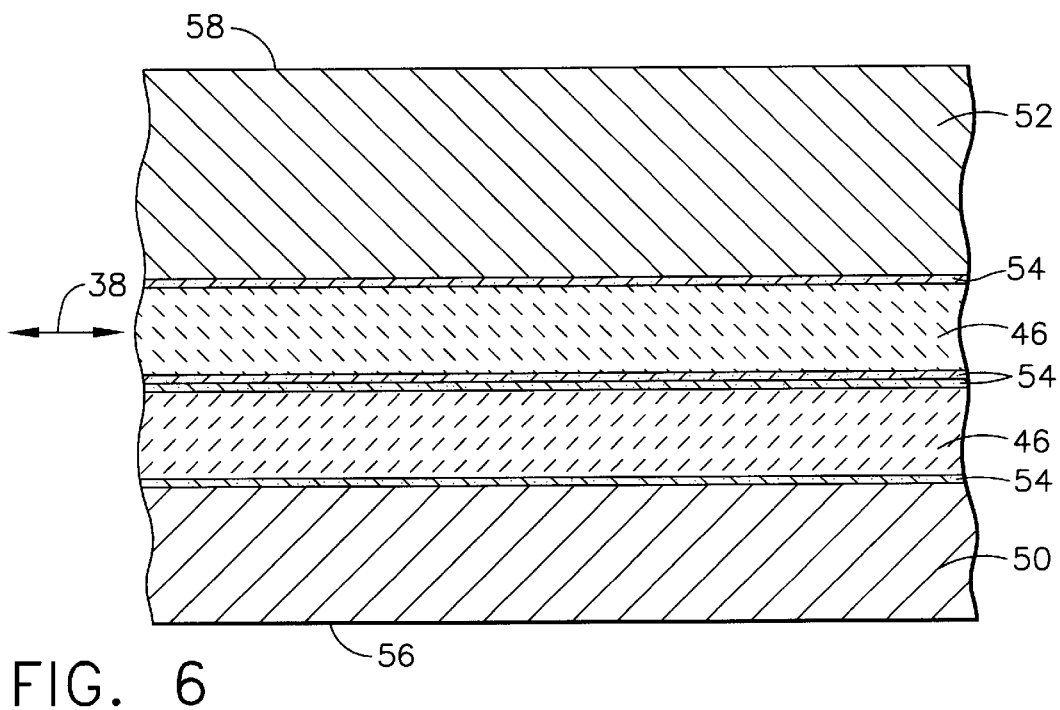
FIG. 6 is a sectional view of the exhaust nozzle compression link of FIG. 5, taken on line 6—6.

Sandwiched between the inner rim 50 and the outer rim 52 are the elongated reinforcing fibers 46. Most conveniently, the elongated reinforcing fibers 46 are arranged in one or more layers or plies, preferably from one to ten layers or plies, with each layer of approximately constant diameter. As shown in FIG. 6, the reinforcing fibers 46 extend parallel to the axis of elongation 38. The reinforcing fibers 46 are preferably embedded and disposed within a matrix 54 comprising a matrix titaniumbase alloy. Care is taken that the reinforcing fibers 46 are not exposed on either an inner surface 56 or an outer surface 58 of the shell 44. The inner rim 50, the matrix 54, the reinforcing fibers 46, and the outer rim 52 are all bonded together to form an integral piece, preferably by diffusion bonding of the titanium together and the reinforcing fibers 46 to the matrix 54.

The matrix titanium-base alloy may be of the same nominal composition as either or both of the inner rim titanium-base alloy and the outer-rim titanium-base alloy, or it may be of a different nominal composition. Preferably, all three titaniumbase alloys, the matrix titanium-base alloy, the inner rim titanium-base alloy, and the outer rim titanium-base alloy, are of the same nominal composition. Examples of operable titanium-base alloys which may be used for the inner rim 50, the outer rim 52, and/or the matrix 54 are Ti-6242, having a nominal composition, in weight percent, of about 6 percent aluminum, about 2 percent tin, about 4 percent zirconium, about 2 percent molybdenum, about 0.1 percent silicon, balance titanium and impurities; and Ti-6-4, having a nominal composition, in weight percent, of about 6 percent aluminum, 4 percent vanadium, balance titanium and impurities. The use of the present invention is not, however, limited to these named alloys.

The reinforcing fibers 46 are preferably silicon carbide fibers, which may optionally be formed on carbon or tungsten cores. In a preferred embodiment, the reinforcing fibers 46 are silicon carbide fibers having diameters of about 0.0057 inches. In the preferred layup of the exhaust nozzle compression link 36, there are about 110 fibers for each inch of circumference in the views of FIGS. 4A–4D and 5. The reinforcing fibers 46 may be provided separate from the titanium alloys and then all of the components collated and bonded. The reinforcing fibers 46 are very long compared to their diameters, and are preferably substantially continuous.

As shown in FIGS. 4B–4D and 5, the reinforcing fibers 46 are preferably arranged as layers 60 and 62, in the form of plies of fibers within a layer of the matrix 54, with the reinforcing fibers 46 of each layer staggered with respect to the adjacent layer(s). Equivalently, the reinforcing fibers 46 already embedded within the matrix 46 in the form of plies of material may be purchased commercially from companies such as Textron, Inc., Lowell, Mass.; Atlantic Research Co., Wilmington, Mass.; and/or 3M Company, Minneapolis, Minn. These plies are collated as the layers 60 and 62 with sheets of the material that forms the inner rim 50 and the outer rim 52. The collated stack is hot isostatically pressed to bond the structure together.

There is at least one layer of the reinforcing fibers 46 extending around the circumference of the shell 44, as shown in FIGS. 4A–4D and 5. There is illustrated a preferred embodiment where there are two layers, and typically there are one to ten layers, of the reinforcing fibers 46. Some but not all of the layers may have limited circumferential regions 64 where there are no reinforcing fibers.

In a design developed by the inventors, the inner rim 50 is Ti-6242 alloy and is a minimum of 0.005 inch thick, and the outer rim 52 is Ti-6242 alloy and is a minimum of 0.015 inch thick. There are two layers 60 and 62, each made of Ti-6242 alloy embedded with about 37 volume percent of silicon carbide (SiC) fibers of diameters 0.0057 inch embedded therein, with each of the two layers 60 and 62 about 0.014 inch thick. The exhaust nozzle compression link 36 is about 15 inch long, excluding the attachment fittings 40 and 42.

The exhaust nozzle compression link described in the preceding paragraph was constructed and tested in the exhaust nozzle flap structure of an F110 gas turbine engine. The exhaust nozzle compression link performed successfully in this test.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A hybrid-composite gas turbine exhaust nozzle compression link comprising an elongated hollow tubular shell having an axis of elongation, the elongated hollow tubular shell having a structure in cross section taken perpendicular to the axis of elongation comprising at least one reinforcing layer comprising reinforcing fibers extending parallel to the axis of elongation; and a body comprising at least one titanium-base alloy in which the reinforcing fibers are disposed.

2. The exhaust nozzle compression link of claim 1, wherein the elongated hollow tubular shell is a hollow cylinder in cross section taken perpendicular to the axis of elongation.

3. The exhaust nozzle compression link of claim 1, further including a first attachment fitting on a first end of the elongated hollow tubular shell, and a second attachment fitting on a second end of the elongated hollow tubular shell.

4. The exhaust nozzle compression link of claim 1, wherein the body comprises an inner rim comprising an inner-rim titanium-base alloy, and an outer rim comprising an outer-rim titanium-base alloy, the reinforcing fibers being disposed between the inner rim and the outer rim.

5. The exhaust nozzle compression link of claim 1, wherein the reinforcing fibers comprise silicon carbide fibers.

6. The exhaust nozzle compression link of claim 1, wherein the reinforcing fibers are arranged in at least one ply.

7. The exhaust nozzle compression link of claim 1, wherein the reinforcing fibers are arranged in from one to ten plies.

8. A hybrid-composite gas turbine exhaust nozzle compression link comprising an elongated hollow tubular shell having an axis of elongation, the elongated hollow tubular shell having a structure in cross section taken perpendicular to the axis of elongation comprising an inner rim of an inner-rim titanium-base alloy;

a reinforcing layer comprising reinforcing fibers extending parallel to the axis of elongation; and an outer rim of an outer-rim titanium-base alloy.

9. The exhaust nozzle compression link of claim 8, wherein the elongated hollow tubular shell is a hollow cylinder in cross section taken perpendicular to the axis of elongation.

10. The exhaust nozzle compression link of claim 8, further including a first attachment fitting on a first end of the elongated hollow tubular shell, and a second attachment fitting on a second end of the elongated hollow tubular shell.

11. The exhaust nozzle compression link of claim 8, wherein the inner-rim titanium-base alloy and the outer-rim titanium-base alloy are of the same nominal composition.

12. The exhaust nozzle compression link of claim 8, wherein the inner-rim titanium-base alloy is an alloy selected from the group consisting of alloys having a nominal composition, in weight percent, of about 6 percent aluminum, about 2 percent tin, about 4 percent zirconium, about 2 percent molybdenum, about 0.1 percent silicon, balance titanium and impurities; and having a nominal composition, in weight percent, of about 6 percent aluminum, 4 percent vanadium, balance titanium and impurities.

13. The exhaust nozzle compression link of claim 8, wherein the reinforcing fibers comprise silicon carbide fibers.

14. The exhaust nozzle compression link of claim 8, wherein the reinforcing layer further comprises
   a matrix in which the reinforcing fibers are disposed, the matrix comprising a matrix titanium-base alloy.

15. The exhaust nozzle compression link of claim 14, wherein the matrix titanium-base alloy is of the same nominal composition as the inner-rim titanium-base alloy and the outer-rim titanium-base alloy.

16. The exhaust nozzle compression link of claim 8, wherein the reinforcing fibers are arranged in at least one ply.

17. The exhaust nozzle compression link of claim 8, wherein the reinforcing fibers are arranged in from one to ten plies.

18. The exhaust nozzle compression link of claim 8, wherein the reinforcing fibers are arranged in at least one ply, with each ply having a cylindrical symmetry.

19. A hybrid-composite gas turbine exhaust nozzle compression link comprising
   an elongated hollow tubular shell having an axis of elongation, the elongated hollow tubular shell having a structure in cross section taken perpendicular to the axis of elongation comprising
      an inner rim of a titanium-base alloy,
      a reinforcing layer comprising reinforcing fibers extending parallel to the axis of elongation and embedded in a matrix comprising the titanium-base alloy, and
      an outer rim of the titanium-base alloy;
   a first attachment fitting integral with a first end of the elongated hollow tubular shell; and
   a second attachment fitting adjustably fixed to a second end of the elongated hollow tubular shell.

\* \* \* \* \*